United States Patent [19]

Kawaguchi

[11] Patent Number: 5,403,529
[45] Date of Patent: Apr. 4, 1995

[54] METHOD FOR FORMING COMPOSITE SYNTHETIC RESIN MATERIAL

[75] Inventor: Kiyoshi Kawaguchi, Kanagawa, Japan

[73] Assignee: Toyo Seikan Kaisha, Ltd., Tokyo, Japan

[21] Appl. No.: 43,404

[22] Filed: Apr. 6, 1993

[30] Foreign Application Priority Data

Apr. 6, 1992 [JP] Japan .................................. 4-112426

[51] Int. Cl.$^6$ ............................................. B29C 47/06
[52] U.S. Cl. ................................... 264/167; 264/171; 425/132
[58] Field of Search ............... 264/167, 171, 173, 172; 425/133.1, 132

[56] References Cited

U.S. PATENT DOCUMENTS

| | | | |
|---|---|---|---|
| 3,461,197 | 8/1969 | Lemelson | 425/132 |
| 3,550,203 | 12/1970 | Lemelson | 425/132 |
| 4,056,344 | 11/1977 | Lemelson | 425/132 |
| 4,828,780 | 5/1989 | Luker | 264/171 |
| 4,904,512 | 2/1990 | Yamada et al. | |
| 5,104,305 | 4/1992 | Kawaguchi et al. | |
| 5,162,121 | 11/1992 | Kawaguchi et al. | |

*Primary Examiner*—Mathieu D. Vargot
*Attorney, Agent, or Firm*—Christopher R. Pastel; Thomas R. Morrison

[57] ABSTRACT

The running length of an inner synthetic resin within an outer synthetic resin in a composite synthetic resin is reduced by flowing a forced synthetic resin flow behind intermittent flows of the inner synthetic resin. The forced synthetic resin is of the same type as the outer synthetic resin. The composite resin flowing out of the apparatus is cut with a heated wire.

11 Claims, 7 Drawing Sheets

METHOD FOR FORMING COMPOSITE SYNTHETIC RESIN MATERIAL

BACKGROUND OF THE INVENTION

This invention relates to a method and equipment for forming a composite resin material comprising an outer synthetic resin layer and an inner synthetic resin layer enveloped by the outer synthetic resin layer.

A compressed multi-layer molded structure comprising an outer synthetic resin layer and an inner synthetic resin layer enveloped by the outer synthetic resin layer is disclosed in the Japanese Laid-open Patent Publication No. 62-184817. This compressed molded product of multi-layer structure is conveniently used to produce containers, container lids, or liners for containers. In such applications, the outer synthetic resin layer is formed from synthetic resin of a type having superior mechanical and sanitary properties, and the inner synthetic resin layer is formed from synthetic resin of a type having superior gas-barrier and heat-resistance properties.

The foregoing Japanese Patent Laid-open Patent Publication No. 62-184817 discloses a device for forming a composite synthetic resin material in which an inner synthetic resin layer is enveloped by an outer synthetic resin layer. The assembly thus formed is compressed to form the foregoing multi-layer compressed mounding product. This device for forming the composite synthetic resin includes a main channel with a discharge opening at its tip. The synthetic resin for forming the outer synthetic resin layer is fed continuously into the main channel. The inner synthetic resin layer is fed into the main channel through an inflow opening communicating with the main channel. An inner synthetic resin channel communicates with the inflow opening. The inner synthetic resin is fed by intermittently applying pressure to feed the synthetic resin through the inner synthetic resin channel and the intermittent inflow opening, and thence into the continuous flow of outer synthetic resin. A shutter opens and closes the intermittent inflow opening to provide intermittent flow of inner synthetic resin through the intermittent inflow opening. The inner synthetic resin flows under pressure into the outer synthetic resin of the main channel through the inner synthetic resin channel and the intermittent inflow opening. This process deposits inner synthetic resin at intervals in the outer synthetic resin flow. The combined synthetic resin flow is discharged from the discharge opening and cut by a cutting means through portions of the combined synthetic resin flow where the inner synthetic resin is absent. The cutting means includes a cutting edge which is rotated across the composite synthetic resin flow, in the horizontal direction against the direction of running. Thus, separated pieces of the composite synthetic resin material is formed in which inner synthetic resin is enveloped by outer synthetic resin.

Japanese Laid-open Patent Publication No. 1-195016 discloses a device for forming a composite synthetic resin material in which at least the lower channel end thereof is provided with an auxiliary channel surrounding the intermittent inflow opening. The auxiliary channel is elongated in the inside of the circular cross-sectional part of the main channel, to prevent so called threading phenomenon. The threading phenomenon is one in which the inner synthetic resin continues to feed a small amount of inner synthetic resin even after the intermitted inflow member is closed by its shutting member. The small amount of material fed at these times produce elongates thread-like strands even after the intermittent inflow opening is closed. The continued feeding is caused by the composite resin running in the auxiliary channel colliding with the tip of the opening at the shutting member, thereby scratching off some of the remaining inner synthetic resin and adding an unwanted string-like portion to the flow of outer synthetic resin. If the synthetic resin running in the auxiliary channel is identical to the outer synthetic resin running in the main channel, then no difficulty results. However, when the two types of synthetic resin are different is properties or color, the threading phenomenon is a problem.

In the above-described conventional techniques for forming composite synthetic resin materials, and in the device itself, a number of problems remain to be solved.

First, when the composite synthetic resin is produced at a relatively high speed, the threading phenomenon of the inner synthetic resin leaves a relatively long tail in the upstream direction of flow, thereby leaving relatively short lengths of the composite material at which cut can be made without cutting through the inner synthetic resin.

The resulting precision required to cut the composite synthetic resin, without exposing is difficult to achieve and, upon failure to achieve the required precision, the serious possibility exists of producing defective composite synthetic resin materials in which the inner synthetic resin is exposed at the cuts.

The composite synthetic resin is cut by a rotating blade intersecting the flow of the composite synthetic resin exiting the discharge opening. Sometimes, instead of the cut material leaving the cutting edge cleanly, a portion tends to stick to the blade. During subsequent cuts, the material stuck to the blade, partly cooled and hardened during its time on the blade, becomes detached from the blade, and is added to the new material leaving the discharge opening. This produces undesirable unevenness in the cut pieces.

OBJECTS AND SUMMARY OF THE INVENTION

It is an object of the present invention produce a method and apparatus for forming a composite synthetic resin material that overcome the drawbacks of the prior art.

Briefly stated, the present invention provides a method and apparatus in which the length of an inner synthetic resin within an outer synthetic resin in a composite synthetic resin is reduced by forcing a forced synthetic resin flow behind intermittent flows of the inner synthetic resin. The synthetic resin in the forced resin flow is of the same type as the outer synthetic resin. The composite resin flowing out of the apparatus is cut with a heated wire.

The first technical task is to reduce the length of inner synthetic resin which continues to flow during intervals following shutoff of the inner synthetic resin. It is desirable to accomplish this without reducing the amount of inner synthetic resin supplied. It is also desirable to permit the composite synthetic resin to be discharged from the discharge opening at a relatively high speed. When the length of inner synthetic resin is reduced, the regions in which only outer synthetic resin exists are increased. This increase in permissible cutting positions reduces the precision required in the cutting operation to cut the flow of composite synthetic resin at points that contain only outer synthetic resin.

To solve the first technical task, the present invention shortens the length of the inner synthetic resin by delaying the time for starting the intermittent pressurized influx of inner synthetic resin, flowing the inner synthetic resin under pressure through the intermittent inflow opening, and forcing the inner synthetic resin to flow inside the composite synthetic resin from the upper side.

According to the present invention, as a method for achieving the foregoing first task, a method for forming a composite synthetic resin material is provided, wherein the method comprises the formation of outer synthetic resin flow by running the outer synthetic resin through a main channel, the formation of composite synthetic resin flow in which an inner synthetic resin exists at certain intervals in the outer synthetic resin flow by flowing in the inner synthetic resin under pressure and intermittently through the intermittent inflow opening opened in the main channel, and the formation of composite synthetic resin material comprising the outer synthetic resin layer and the inner synthetic resin layer enveloped thereby by cutting the composite synthetic resin flow which is flowing out from the main channel, transversely against the running direction in the region where the inner synthetic resin does not exist, and further the method comprises the formation of the composite synthetic resin material comprising the outer synthetic resin layer and the inner synthetic resin layer enveloped thereby, in which the running length of the inner synthetic resin is shortened by delaying a required time against the influx of the inner synthetic resin under pressure, flowing in the forced synthetic resin under pressure and intermittently through the intermittent inflow opening, and oppressing the inner synthetic resin from the upper channel side in the direction of running.

According to an embodiment of the invention, there is provided a method for forming a composite synthetic resin material comprising: flowing an outer synthetic resin through a main channel, intermittently flowing an inner synthetic resin into the outer synthetic resin flowing in the main channel to deposit the inner synthetic resin at spaced-apart locations enveloped in the outer synthetic resin, and forcing a forced synthetic resin under pressure into the outer synthetic resin closely behind the inner synthetic resin, whereby a length of the composite synthetic resin material containing the inner synthetic resin material is reduced.

According to a feature of the invention, there is provided apparatus for forming a composite synthetic resin material comprising: a main channel, an opening at a tip of the main channel, means for the continuous feeding of an outer synthetic resin through the main channel, an intermittent inflow opening opening into the main channel, an inner channel communicating with the intermittent inflow opening, means for intermittently forcing an inner synthetic resin under pressure through the intermittent inflow opening, an outflow opening, means for permitting the composite synthetic resin to flow through the outflow opening, means for cutting the composite synthetic resin flowing from the outflow opening, in regions of the composite synthetic resin where the inner resin does not exist.

According to a further feature of the invention, there is provided equipment for forming a composite synthetic resin material comprising: a main channel, an outflow opening at a tip of the main channel, means for continuously feeding an outer synthetic resin continuously to the main channel for forming an outer synthetic resin flow, an intermittent inflow opening opening into the main channel, an inner channel communicating with the intermittent inflow opening, means for producing an intermittently pressurized inflow of inner synthetic resin through the intermittent inflow opening for forming a composite synthetic resin flow where the inner synthetic resin exists at intervals in the outer synthetic resin flow, an outflow opening, means for flowing the composite synthetic resin through the outflow opening, and means for cutting the composite synthetic resin flowing from the outflow opening in regions of the composite synthetic resin where the inner synthetic resin does not exist, thereby forming the composite synthetic resin material comprising an outer synthetic resin layer and an inner synthetic resin layer enveloped by the outer synthetic resin layer.

The above, and other objects, features and advantages of the present invention will become apparent from the following description read in conjunction with the accompanying drawings, in which like references numerals designate the same elements.

DETAILED DESCRIPTION OF PREFERRED EMBODIMENTS

Figure 1:
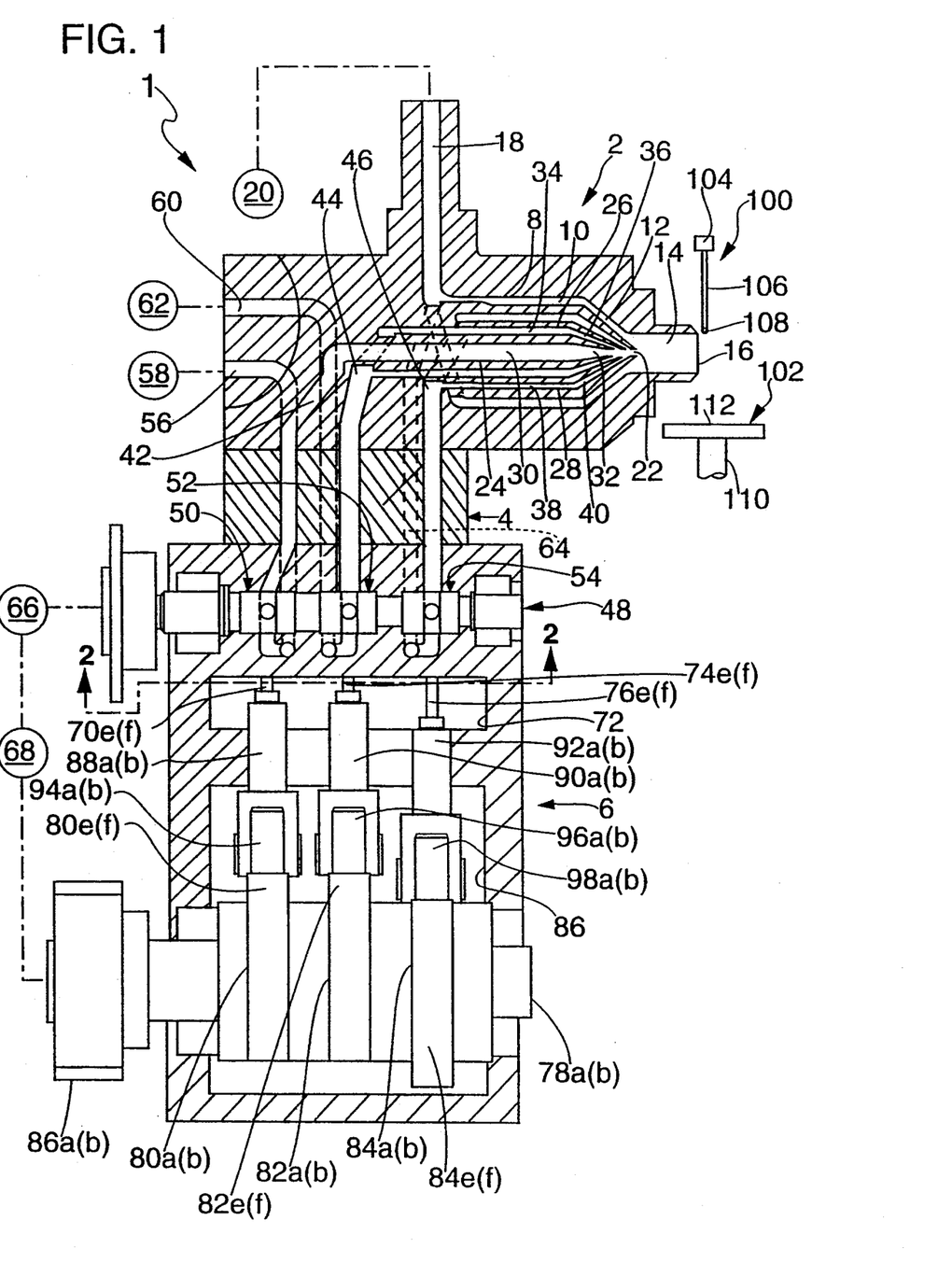
FIG. 1 is a cross-sectional view illustrating an embodiment of the equipment for forming composite synthetic resin material according to an embodiment of the invention.

Referring to FIG. 1, an extruder, shown generally at 1, for forming a composite synthetic resin includes a channel block 2 mounted atop a connecting block 4. An intermittent feed block 6 is affixed below connecting block 4. Channel block 2 and intermittent feed block 6 are generally built up from a plurality of components, but are illustrated as single components for clarifying the illustration and description.

A main channel 8 in channel block 2 includes an upper channel part 10, an intermediate channel part 12, and a lower channel 14, in the downstream direction of flow. Upper channel part 10 has a circular cross section. Intermediate channel part 12 also has a circular cross section. Intermediate channel part 12 tapers from a radius matching upper channel part 10 to a radius matching lower channel part 14. Lower channel part 14 has a round cross section opening into a round outflow opening 16 at its exit or lower channel end. A feed channel 18 is connected to the upstream end of main channel 8 to feed heated outer synthetic resin in a continuous stream from a conventional extruder 20 (not otherwise shown) to feed channel 18. The outer synthetic resin is preferably of a type having superior mechanical and sanitary properties such as, for example, polypropylene.

An intermittent inflow opening 22 is centered in a region between intermediate channel part 12 and lower channel part 14 of main channel 8. Intermittent inflow opening 22 has a relatively small round shape. Three coaxial channels, an inner channel 24, an intermediate channel 26, and a forced channel 28 are disposed concentrically within inner channel 24, intermediate channel 26 and forced channel 28 of main channel 8 in channel block 2 to feed inner plastic resin to intermittent inflow opening 22.

In greater detail, inner channel 24, centered in main channel 8, includes a cylindrical main part 30 and a lower channel part 32 in the form of a truncated cone. Intermediate channel 26 surrounds main channel 8 annularly with a shape generally following that of main channel 8, including an annular main part 34 and a tapering circular lower channel part 36. Forced channel 28 surrounds intermediate channel 26 annularly with a circular main part 38 and a tapering circular lower channel part 40.

A connecting channel 42 is connected to an upstream end of inner channel 24. A connecting channel 44 is connected to an upstream end of intermediate channel 26. A connecting channel 46 is connected to a lower end of forced channel 28. Connecting channels 42, 44 and 46 extend downward from channel block 2, passing through connecting block 4.

A rotating shaft 48 is mounted for free rotation in an upper part of intermittent feed block 6. Three four-directional valves 50, 52 and 54 are incorporated into rotating shaft 48 at intervals along its axis.

Figure 2:
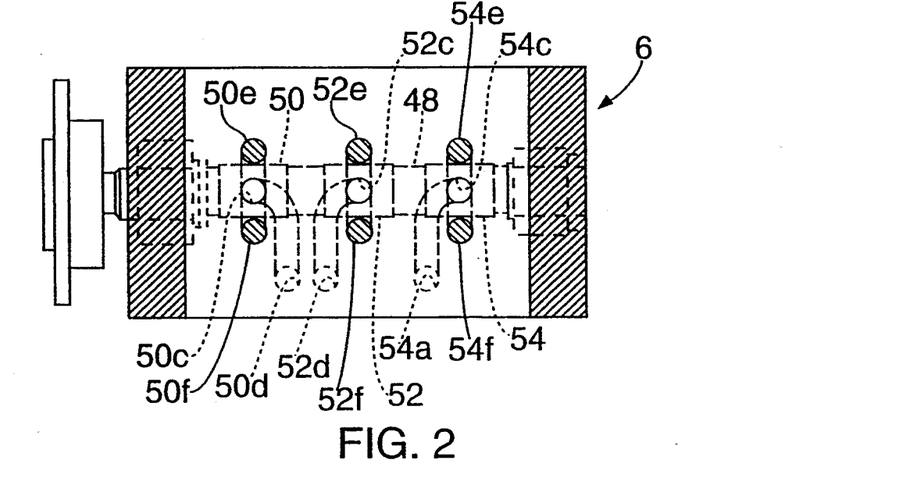
FIG. 2 is a cross-sectional view taken along line A—A in FIG. 1.
Figure 3:
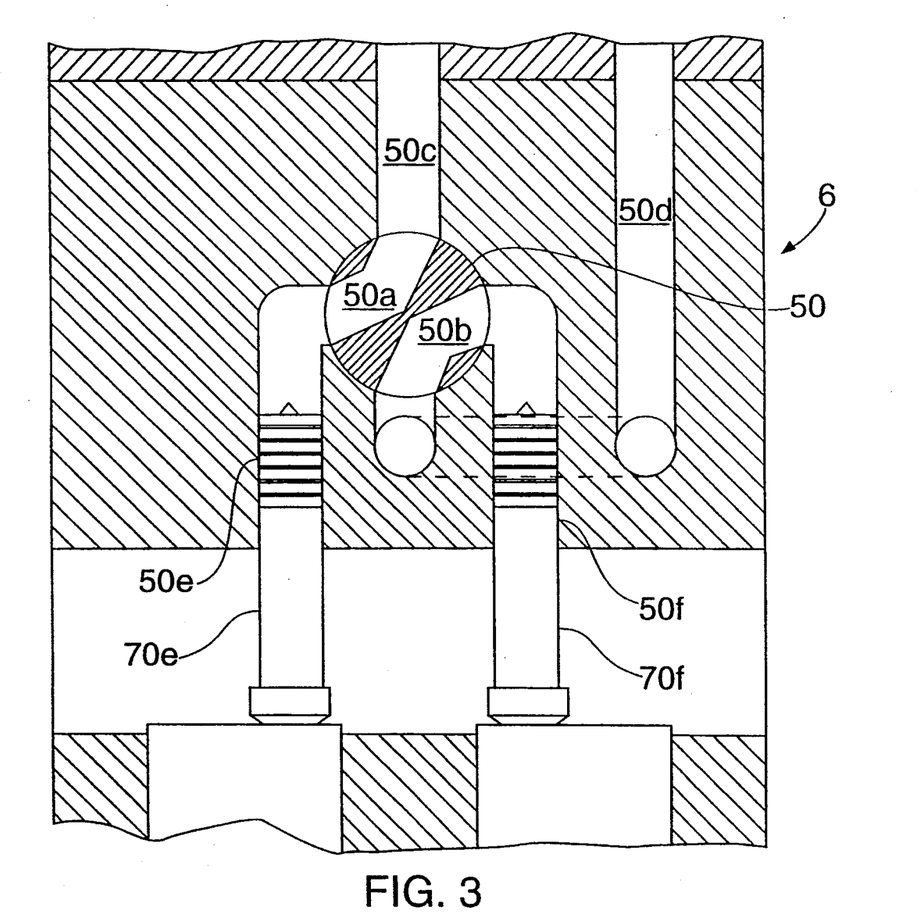
FIG. 3 is a fragmentary sectional view illustrating a four-directional valve and its related configuration in the apparatus of FIG. 1.

Referring now also to FIGS. 2 and 3 together with FIG. 1, four-directional valve 50 has two communicating channels 50a and 50b, an outflow channel 50c, an inflow channel 50d, and two plungers 50e, 50f.

Four-directional valves 52 and 54 have the same elements as four-directional valve 50, differing only in that the reference designators of the elements are used with reference numerals 52 and 54, respectively, and thus do not require further detailed description.

Outflow channel 50c of four-directional 50 is connected to inner channel 24 through connecting channel 42. Inflow channel 50d of four-directional valve 50 is connected to the lower channel end of a feed channel 56 in channel block 2 and connecting block 4. An extruder 58 is connected to the upper channel end of feed channel 56. Extruder 58 continuously extrudes an inner synthetic resin in a molten, or softened state into feed channel 56. The inner synthetic resin is preferably of a type possessing superior gas barrier properties.

Outflow channel 52c of four-directional valve 52 is connected to intermediate channel 26 through connecting channel 44. Inflow channel 52d of four-directional valve 52 is connected to the lower channel end of a feed channel 60 in channel block 2 and connecting block 4. An extruder 62 is connected to the upper channel end of feed channel 60 to continuously extrude an intermediate synthetic resin in a molten or softened state. The intermediate synthetic resin is preferably of a type having suitable adhesion with the outer synthetic resin extruded from extruder 20 and the inner synthetic resin extruded from extruder 58.

Outflow channel 54c of four-directional valve 54 is connected to forced channel 28 through connecting channel 46. Inflow channel 54d of four-directional valve 54 is connected to the lower channel end of a feed channel 64 in channel block 2 and connecting block 4. Feed channel 64 receives a continuous flow of molten or softened outer synthetic resin from extruder 20.

The left end of rotating shaft 48, in FIG. 1, extends outward beyond intermittent feed block 6. A conventional rotation-driving source 68, which may be, for example, an electric motor (not shown) drives a conventional intermittent rotation mechanism 66 connected to rotating shaft 48 through a power-transmission device illustrated as a dash-double-dot line. Intermittent rotation mechanism 66 rotates rotating shaft 48 intermittently in increments of 90 degrees. During alternate 90-degree increments of rotation, four-directional valve 50 alternately connects plunger 50e to outflow channel 50c through one of communicating channel 50a and 50b and connects plunger 50f to inflow channel 50d through the other thereof. In addition, four-directional valve 50 connects plunger 50e to inflow channel 50d through one of communicating channels 50a and 50b and connects plunger 50f to outflow channel 50c through the other thereof.

The intermittent rotation of rotating shaft 48 in 90-degree increments controls four-directional valve 52 to alternately connect plunger 52e to outflow channel 52c through one of communicating channel 52a or 52b and connects plunger 52f to inflow channel 52d through the other thereof. In addition, the intermittent rotation connects plunger 52e with inflow channel 52d through one of communicating channels 52a or 52b and connects plunger 52f to outflow channel 52c through the other thereof.

The intermittent rotation of rotating shaft 48 in 90-degree increments controls four-directional valve 54 to alternately connect plunger 54e to outflow channel 54c through one of communicating channels 54a or 54b, and connects plunger 54f to inflow channel 54d through the other thereof. In addition, plunger 54e is alternately connected to inflow channel 54d through one of communicating channels 54a or 54b and connects plunger 54f to outflow channel 54c through the other thereof.

Plungers 50e and 50f of four-directional valve 50 constitute an intermittently pressurized influx means for inner synthetic resin. Plunger cylinders (not numbered) in intermittent feed block 6 contain plungers 50e and 50f. Plunger pistons 70e and 70f are mounted below plungers 50e and 50f, respectively, to slide freely upward and downward as shown in FIG. 3. Plunger pistons 70e and 70f extend in the vertical direction in FIG. 1 and parallel to one another at intervals in left and right directions in FIG. 3.

A relatively large rectangular opening 72 is formed at the upper part of intermittent block 6. The lower ends of plunger pistons 70e and 70f project into rectangular opening 72.

Plungers 52e and 52f of four-directional valve 52 and plungers 54e and 54f of four-directional valve 54 constitute means for the intermittently pressurized inflow of intermediate synthetic resin and outer synthetic resin, respectively. Plungers 52e, 52f, 54e and 54f, together with their associated plunger pistons 74e, 74f, 76e and 76f, are identical to their counterparts in four-directional valve 50, and thus do not require additional description.

Referring now to FIGS. 4A to 4E together with FIGS. 1 and 3, rotating axes 78a and 78b, extending in the vertical direction of FIG. 1 and parallel to each other spaced apart to the left and right in FIG. 2, are mounted for free rotation in the lower part of intermittent feed block 6. Three cam members 80a, 82a and 84a are fixed at intervals along a rotating axis 78a. An additional three cam members 80b, 82b and 84b are fixed at intervals along rotating axis 78b. A relatively large opening 86 is formed in the lower to middle part of intermittent feed block 6. Cam members 80a, 80b, 82a, 82b, 84a and 84b are positioned in opening 86.

As clearly illustrated in FIGS. 4A to 4E, cam members 80a and 80b are discs having projecting parts 80e and 80f at specific angles about the circumference of a circle. Cam members 82a, 82b, 84a and 84b are similarly disks with projecting parts 82e, 82f, 84e and 84f, respectively, all disposed at selected angles about their respective disks.

An end of each of rotating axes 78a and 78b projects beyond intermittent feed block as shown in FIG. 1 (only rotating axis 78a is shown in FIG. 1, rotating axis 78b is hidden by rotating axis 78a). Input gears 86a and 86b are fixed to the projecting ends of axes 78a and 78b, respectively. Input gears 86a and 86b are connected to rotation-driving source 68 through an appropriate gear train (illustrated as a dash-double-dot line). The gearing is set up to drive rotating axes 78a and 78b continuously in opposite directions from one another as shown by arrows in FIGS. 4A to 4E.

Referring now to FIG. 1, FIG. 3 and FIGS. 4A to 4E, interlocking members 88a and 88b, 90a and 90b, and 92a and 92b, corresponding to cam members 80a and 80b, 82a and 82b, and 84a and 84b, respectively, are mounted for free upward and downward movement in the middle part of intermittent feed block 6. Rollers 94a and 94b, 96a and 96b, and 98a and 98b are mounted for free rotation on the lower ends of interlocking members 88a and 88b, 90a and 90b, and 92a and 92b, respectively. Rollers 94a and 94b, 96a and 96b, and 98a and 98b contact their respective cam members 80a and 80b, 82a and 82b, and 84a and 84b, respectively. The lower ends of plunger pistons 70e and 70f, 74e and 74f, and 76e and 76f contact the upper ends of interlocking members 88a and 88b, 90a and 90b, and 92a and 92b, respectively.

As clearly shown in FIGS. 4A to 4E, projecting parts 80e and 80f of cam members 80a and 80b displace interlocking members 88a and 88b upward and downward at the required times during a single rotation of rotating axes 78a and 78b. The displacement of interlocking members 88a and 88b produce corresponding displacement of plunger pistons 70e and 70f at the same times.

Likewise, interlocking members 90a and 90b, and 92a and 92b are displaced upward and downward at their required timings, during a single rotation of rotating axes 78a and 78b, thereby displacing their respective plunger pistons 74e and 74f and 76e and 76f upward and downward at corresponding timings. The amount of displacement of plunger pistons 70a and 70b, 74a and 74b, and 76a and 76b is controlled by the amount by which projecting parts 80e and 80f, 82e and 82f, and 84e and 84f project from the disk members of cam members 80a and 80b, 82a and 82b, and 84a and 84b. The relative timing of the upward and downward displacement of plunger pistons 70a and 70b, 74a and 74b, and 76a and 76b is controlled by the angular positions of projecting parts 80e, 80f, 82e, 82f, 84e and 84f about their respective disks.

Figures 5, 6:
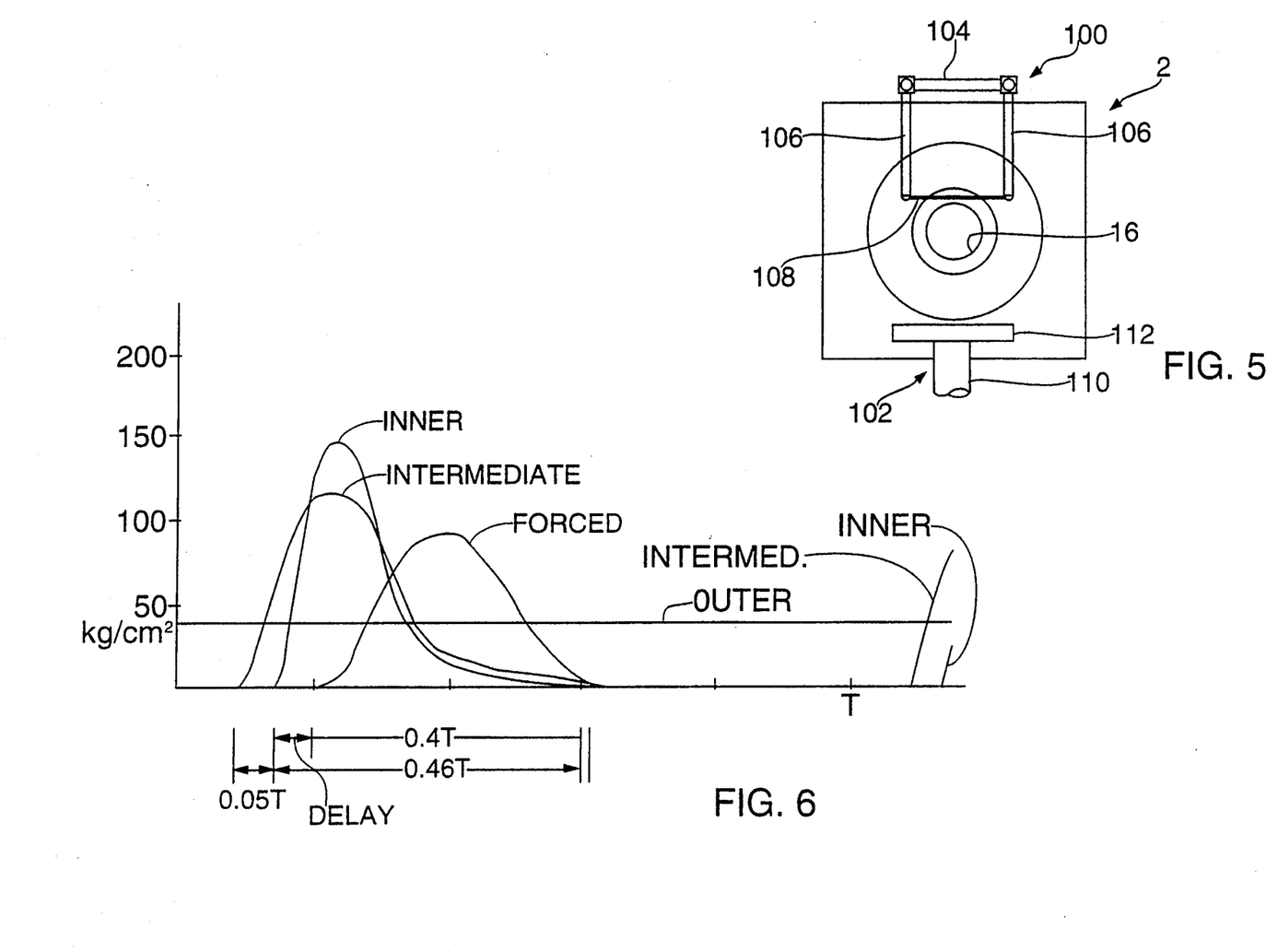
FIG. 5 is a side elevation of the cutting means and the receiving stand of FIG. 1.
FIG. 6 is a set of pressure curves showing the pressure and timing relationship between the four pressurized flows of synthetic resin in the apparatus of FIG. 1.

Referring now to FIGS. 1 and 5, a cutting means 100 and a receiving stand 102 are mounted adjacent outflow opening 16 at the tip of channel block 2. A supporting member 104 of cutting means 100 is mounted above outflow opening 16. Hanging members 106 extend downward from supporting member 104 to stretch a heatable thin wire 108 between their lower ends. Heatable thin wire 108 is made from any suitable electric resistance material such as, for example, Nichrome wire. Heatable thin wire 108 is connected to a conventional power source (not illustrated) through an appropriate control circuit for heating to a required cutting temperature.

Supporting member 104 is displaced by conventional means, coordinated with the motion of plunger pistons 70e, 70f, 74e, 74f, 76e and 76f to move up and down at times that a portion of the composite synthetic resin, not containing inner synthetic resin, passes its position. As detailed later, heatable thin wire 108 cuts through the synthetic resin exiting outflow opening 16. Receiving stand 102, disposed below outflow opening 16, includes a receiving plate 112 affixed to an upper end of a rod 110. Rod 102 and receiving plate 112 are raised and lowered by an appropriate raising and lowering mechanism (not illustrated) coordinated with the operating of the remainder of the system.

Referring now to FIGS. 6 and 7A through 7E along with FIG. 1, outer synthetic resin 114 is extruded continuously from extruder 20 into main channel 8 through feed channel 18 under a suitable pressure of, for example, 35 to 40 kg/cm2. As illustrated in FIG. 6, inner synthetic resin 116, intermediate synthetic resin 118 and forced synthetic resin 120 are forced to flow intermittently under pressure into main channel 8 through intermittent inflow opening 22, while the outer synthetic resin 114 continues to flow in main channel 18. In a cycle time T of, for example, about 1.0 second, the pressure of intermediate synthetic resin 118 rises from a low value to a peak value exceeding the pressure of outer synthetic resin 114. Then, the pressure of inner synthetic resin 116 begins to increase at a rate exceeding the rate of increase of intermediate synthetic resin 118. At about the same time, the pressure of intermediate synthetic resin 118 and the pressure of inner synthetic resin 116 both reach their peaks, with the peak of inner synthetic resin 116 being higher than the peak of intermediate synthetic resin 118. The pressures of intermediate synthetic resin 118 and inner synthetic resin 116 descend past their peaks, with the pressure of inner synthetic resin 116 descending faster so that both become less than the pressure of outer synthetic resin 114 at about the same time, and both continue their reduction below the constant pressure of outer synthetic resin 114. At about the time that intermediate synthetic resin 118 and inner synthetic resin 116 reach their peak, the pressure of forced synthetic resin 120 begins to increase to a peak occurring after the pressures of intermediate synthetic resin 118 and forced synthetic resin 120 have decreased below the pressure of outer synthetic resin 114. Then the pressure of forced synthetic resin 120 decreases to a minimum well before the end of the cycle time T. At the right of FIG. 6, the beginning of the rises of intermediate synthetic resin 118 and inner synthetic resin 116 are shown in the next cycle of operation.

Referring now to FIGS. 2 and 4A to 4E, along with FIG. 1, the intermittent inflow of inner synthetic resin 116 under pressure is explained. Plunger 50e communicates with outflow channel 50c through communicating channel 50a of four-directional valve 50. Plunger 50f communicates with inflow channel 50d through communicating channel 50d of four directional valve 50. Inner synthetic resin 116 has already flowed into plunger 50e during the prior cycle. Inner synthetic resin 116 flows into plunger 50f immediately after the inflow of inner synthetic resin 116 from extruder 58 through inflow channel 50d has been completed. From the condition illustrated in FIG. 4A through that illustrated in FIG. 4B to that illustrated in FIG. 4C, projecting part 80e of cam member 80a raises plunger piston 70e through interlocking member 88a to feed a required amount of inner synthetic resin 116 from plunger 50e under pressure into inner channel 24 through outflow channel 50e and connecting channel 42. Inner synthetic resin 116 is thus intermittently forced under pressure into lower channel part 14 through intermittent inflow opening 22.

Figure 4A:
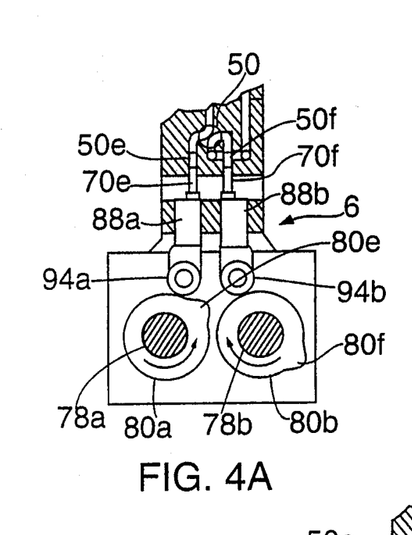
FIGS. 4A through 4E are fragmentary sectional view to which reference will be made in explaining the intermittent pressurized influx of inner synthetic resin in the apparatus of FIG. 1.
Figure 4B:
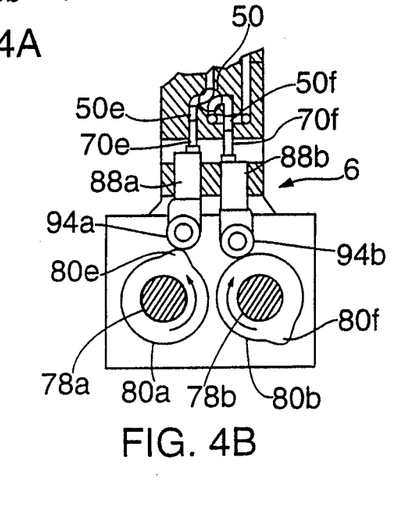
Figure 4C:
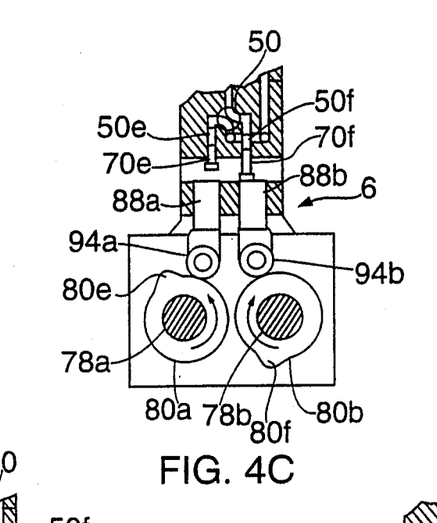
Figure 4D:
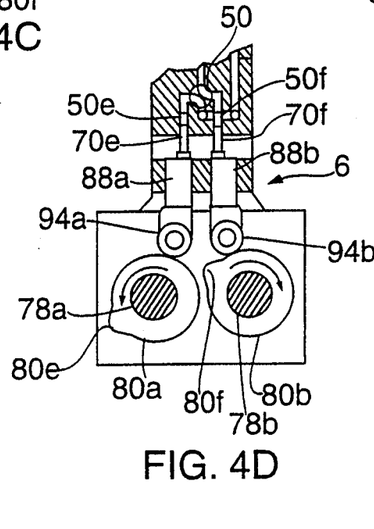

Thereafter, as illustrated in FIGS. 4C and 4D, four-directional valve 50 is rotated 90 degrees, thus connecting plunger 50e to inflow channel 50d through communicating channel 50b, and connecting plunger 50f to outflow channel 50e through communicating channel 50a. This permits inner synthetic resin 116 to flow into plunger 50e through inflow channel 50d from extruder 58. Plunger piston 70e is driven downward by the pressure of inner synthetic resin 116 until its lower end contacts the upper end of interlocking member 88a.

Figure 4E:
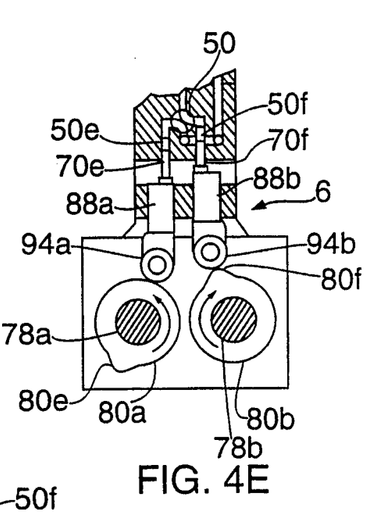

Referring now to FIG. 4E, in the next part of the process, projecting part 80f of cam plate 78b raises interlocking member 88b which, in turn, raises plunger piston 70f to feed a required amount of inner synthetic resin 116 under pressure into inner channel 24 through outflow channel 50c and connecting channel 42 from plunger 50f. In this way, inner synthetic resin 116 is intermittently forced under pressure through intermittent inflow opening 22 into lower channel part 14.

Forced synthetic resin 120 is the same material as outer synthetic resin 114. An intermittently pressurized flow of forced synthetic resin 120 is produced by plunger 54e and 54f in a manner similar to that used to produce the intermittently pressurized flow of inner synthetic resin 116, described above. An intermittently pressurized inflow of intermediate synthetic resin 118 is produced by plungers 52e and 52f in substantially the same manner as described for producing the intermittently pressurized flow of inner synthetic resin 116. Intermediate synthetic resin 118 is forced into plungers 52e and 50f through inflow channel 60 from extruder 62. Forced synthetic resin 120, identical to outer synthetic resin 114, is forced into plungers 54e and 54f through feed channel 18 and inflow channel 64 from extruder 20. If desired, forced synthetic resin 120 may be of a somewhat different composition from outer synthetic resin 114.

FIG. 6 shows an example of intermittently pressurized influx timing and pressures of inner synthetic resin 116, intermediate synthetic resin 118 and forced synthetic resin 120 over one cycle time T (pressures are those in outflow channels 50c, 52c and 54c, respectively). During a cycle time T, the pressure of inner synthetic resin 116 is delayed by, for example, about 0.05 T after the beginning of the influx of intermediate synthetic resin 118. This provides time for intermediate synthetic resin 118 to form ahead of the beginning of the flow of inner synthetic resin 116. After a further delay of, for example, about 0.06 T, the pressure increase of forced synthetic resin 120 begins. Finally, the pressures of inner, intermediate and forced synthetic resins, 116, 118 and 120, respectively, decrease to about zero at about the same time, or within a small time tolerance.

The foregoing example timing is based on a cycle time T of about 1 second. Shorter or longer cycle times may require different absolute or relative timings, however the sequence of timings remains unchanged.

Referring again to FIG. 7A, inner synthetic resin 116, intermediate synthetic resin 118, and forced synthetic resin 120, formed in the preceding cycle are, as shown in FIG. 7A, already well downstream of inflow opening 22, and intermediate synthetic resin 118 is starting to be forced under pressure through inflow opening 22 into outer synthetic resin 114 running in main channel 8.

Figure 7A:
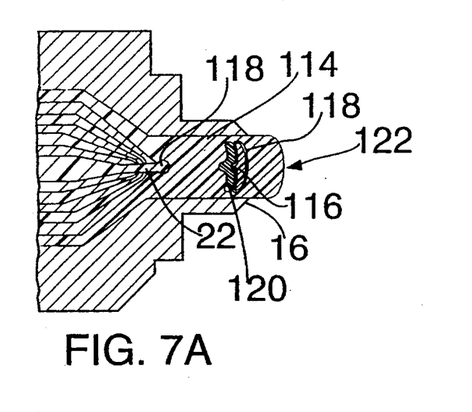
FIGS. 7A to 7E are fragmentary sectional views to which reference will be made in explaining the formation of composite synthetic resin flow in the equipment of FIG. 1.
Figure 7B:
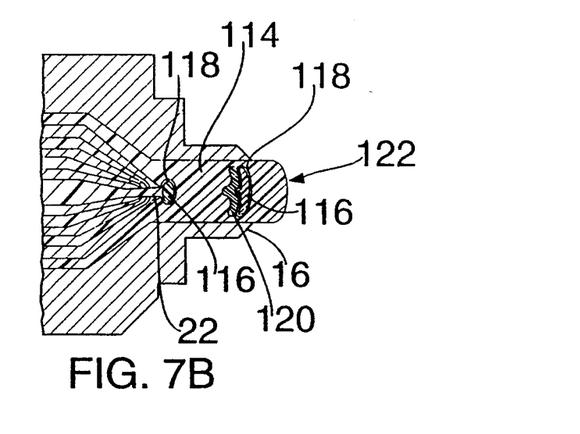

Referring now to FIG. 7B, the intermittently pressurized influx of inner synthetic resin 116 begins following the start of the flow of intermittently pressurized influx of intermediate synthetic resin 118. Thus inner synthetic resin 116 is enveloped in intermediate resin 118, while the combination is forced under pressure into the constantly flowing outer synthetic resin 114.

Figure 7C:
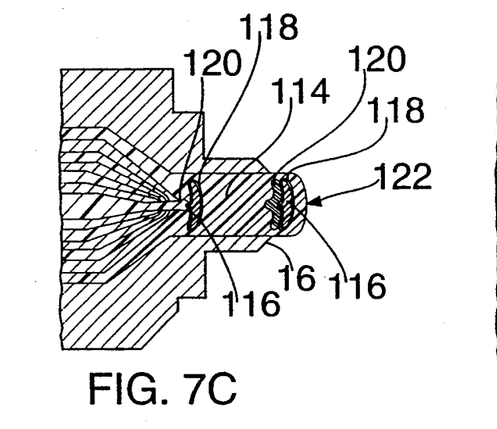
Figure 7D:
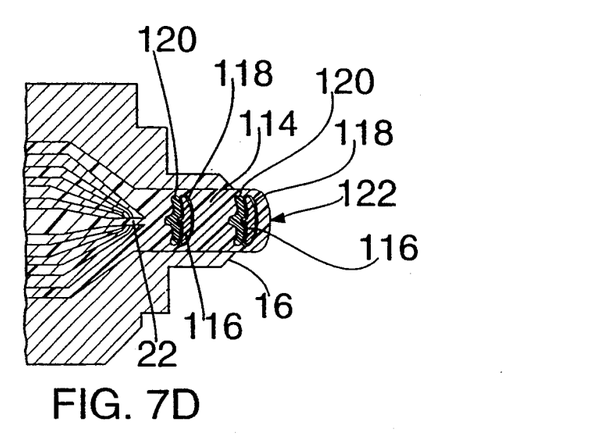
Figure 7E:
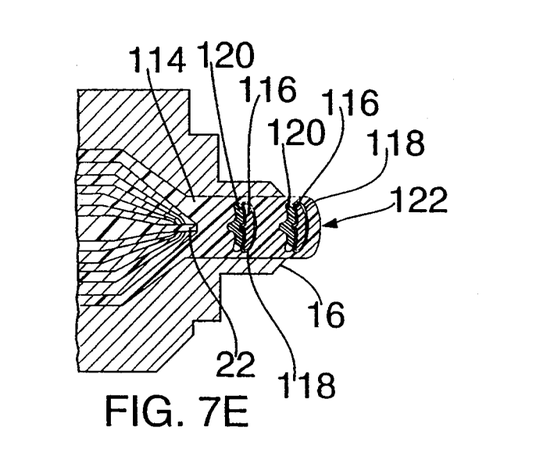

Referring now to FIGS. 7C and 7D, the intermittently pressurized flow of forced synthetic resin 120 is started. As can be clearly understood by comparing the condition shown in FIG. 7C with that in FIG. 7D, the pressurized influx of forced synthetic resin 120 following the pressurized influx of inner synthetic resin 116 suppresses the flow of inner synthetic resin 116, and thereby shortens the length of inner synthetic resin 116 in composite synthetic resin 122. As explained above, the length of composite synthetic resin 122 in which inner synthetic resin 116 does not exist is increased. Thus, composite synthetic resin 122 is formed with inner synthetic resin 116 followed by forced synthetic resin 120 at intervals in outer synthetic resin 114. In the condition shown in FIG. 7E, the region in which inner synthetic resin 116 does not exist is aligned in outflow opening 16.

Referring now to FIGS. 8A to 8E, at the appropriate point in the cycle, supporting member 104 of cutting means 100 is raised into position, and heatable thin wire 108, heated to a temperature between 300° and 350° C. is moved downward through composite synthetic resin 122 across outflow opening 16. Since the cutting takes place only through outer synthetic resin 114 or, equivalently, through the same material of intermediate synthetic resin 118, this cutting does not cause undesirable disarray in the multi-layer structure of composite synthetic resin 122 and does not cause local cooling of composite synthetic resin 122.

Figures 8A, 8B, 8C, 8D, 8E:
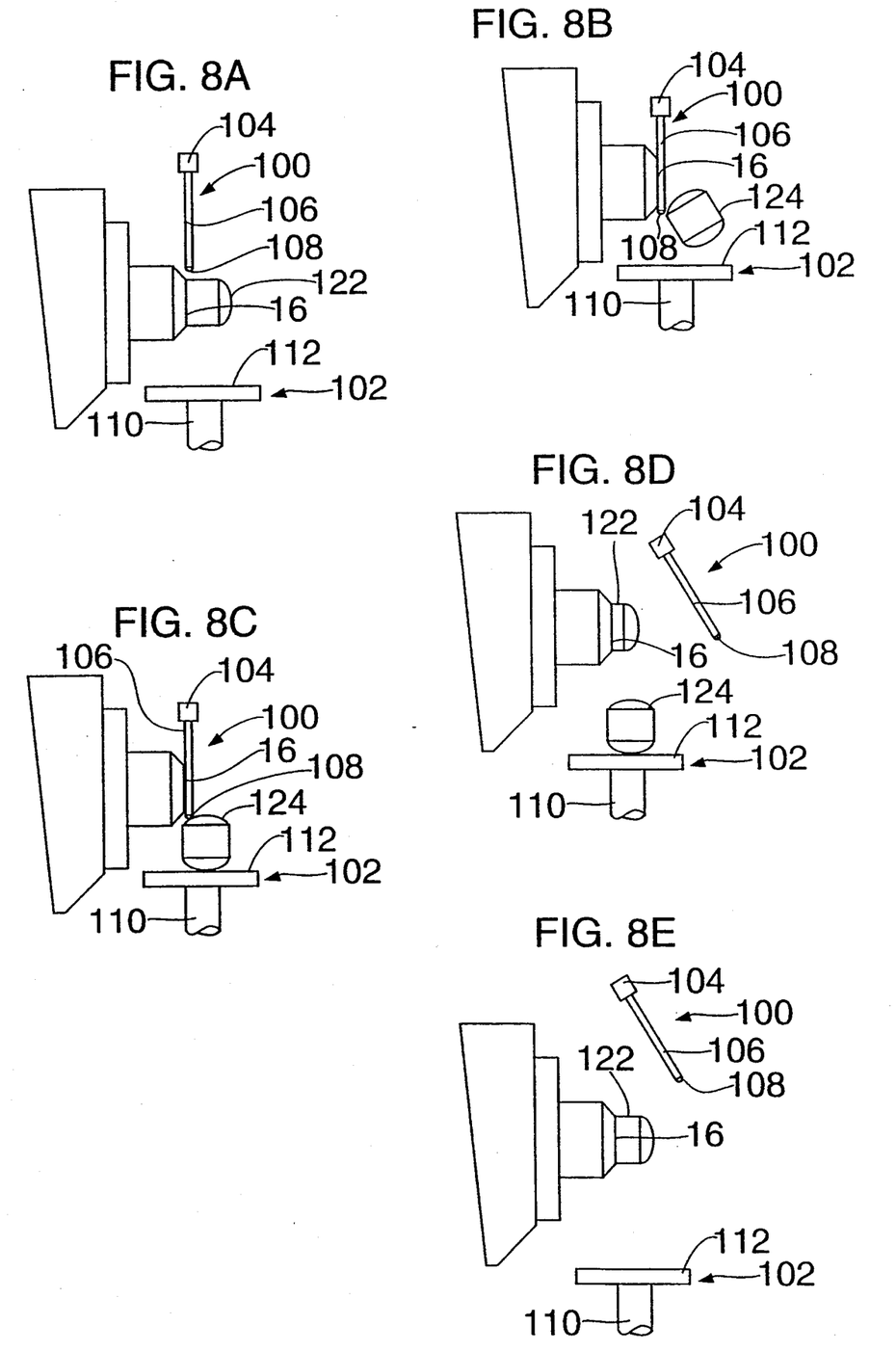
FIGS. 8A to 8E are a fragmentary side elevations to which reference will be made in explaining the cutting operation of the apparatus of FIG. 1.

Referring to FIG. 8C, cut composite synthetic resin material 124 separates from heatable thin wire 108. As it is cut, the downstream end of cut composite synthetic resin material 124 turns to rest on receiving plate 112 of receiving stand 102.

Referring now to FIG. 8D, receiving stand 102 is lowered to some extent. Cut composite synthetic resin 124 on receiving stand 102 is removed by appropriate carrying means (not illustrated), for example, into a compression molding pattern. Cutting member 100 is rotated to move heatable thin wire 108 clear of composite synthetic resin 122 continuing to emerge from outflow opening.

Referring now to FIG. 8E, cutting means is raised in preparation for rotation back into the position shown in FIG. 8A for the beginning of another cycle.

EXAMPLE

An example of a composite synthetic resin 122 was formed using the apparatus and methods described in connection with FIGS. 1 to 8E. "POLYPRO J 440" marketed by Mitsui Petrochemical Industries, Ltd. was used for outer synthetic resin 114 and for forced synthetic resin 120. These materials were continuously extruded by extruder 20 at a temperature of 200° to 220° C. at a flow of about 45 kg/hour. "EVAL EP-T101", marketed by Kuraray Co. Ltd. was used for inner synthetic resin 116. Inner synthetic resin 116 was continuously extruded from extruder 58 at a temperature of 200° to 220° C. and at a flow of 1.8 kg/hour. "MODIC P300F" marketed by Mitsubishi Petrochemical Co., Ltd. was used for intermediate synthetic resin 118. Intermediate synthetic resin 118 was extruded continuously by extruder 62 at a temperature of 200° to 220° C. and at a flow of 1.8 kg/hour.

Figure 9:
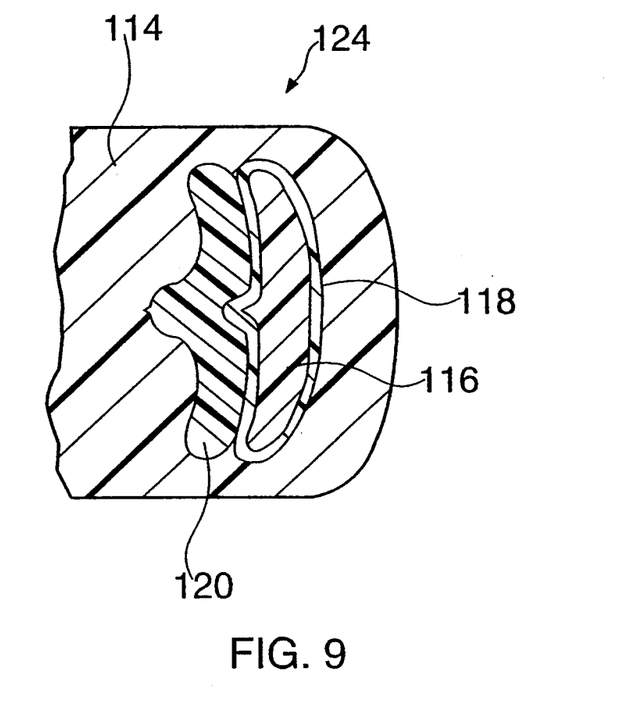
FIG. 9 is a cross-sectional view illustrating the composite synthetic resin material formed by the equipment of FIG. 1.

The diameter of outflow opening 16 in the equipment of the example was 32 mm, and the diameter of intermittent inflow opening 22 was 2.4 mm. Influx pressures and intermittently pressurized influx timing for outer synthetic resin 114, inner synthetic resin 116, intermediate synthetic resin 118 and forced synthetic resin 120 were as shown in FIG. 6. The condition in the vicinity of outflow opening 16 of the equipment for forming the composite synthetic resin material was videotaped and reproduced, and composite synthetic resin 122 flowing from outflow opening 16 and cut composite synthetic resin material 124 were examined (Since "POLYPRO" in the state of fusion as it leaves outflow opening 16 is transparent, it was possible to observe the multi-layer structures of composite synthetic resin 122 and cut composite synthetic resin material 124). The results were as illustrated in FIG. 9, where it was observed that the length occupied by inner synthetic resin 116 was considerably shortened by the forced synthetic resin 120 following it. An examination of the cuts revealed almost no disarray in the multi-layer structure due to cutting.

The method and equipment for forming the composite resin material according to the present invention produces a composite resin material with inner synthetic resin located at periodic intervals within an outer synthetic resin. The length of the composite synthetic resin containing inner synthetic resin is effectively shortened, and the length of region where the inner synthetic resin does not exist in the composite synthetic resin is increased. This simplifies positioning cuts in the composite synthetic resin in regions where the inner synthetic resin is absent, and thereby forming the required composite synthetic resin material.

The method and equipment of the present invention permits transverse cutting of the composite synthetic resin flowing from the outflow opening without causing undesirable disarray in the multi-layer structure and without the cutting causing local cooling. Also, cut pieces of composite synthetic resin separate cleanly from the cutting means.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for forming a composite synthetic resin material comprising:
    flowing an outer synthetic resin through a main channel;
    intermittently flowing an inner synthetic resin into said outer synthetic resin flowing in said main channel to deposit said inner synthetic resin at spaced-apart locations enveloped in said outer synthetic resin; and
    intermittently flowing a forced synthetic resin under pressure into said outer synthetic resin closely behind said inner synthetic resin, whereby a running length of said composite synthetic resin material containing said inner synthetic resin material is reduced.

2. A method according to claim 1, wherein said composite synthetic resin has locations where said inner synthetic resin is absent.

3. A method according to claim 1, wherein the step of intermittently flowing a forced synthetic resin includes:
    delaying a beginning of flowing of said forced synthetic resin until after a beginning of the step of intermittently flowing said inner synthetic resin; and
    continuing said flowing of said forced synthetic resin beyond a substantial portion of said intermittently flowing said inner synthetic resin, whereby said inner synthetic resin is pressed on its upstream side by said forced synthetic resin.

4. A method according to claim 1, wherein said forced synthetic resin is the same material as said outer synthetic resin.

5. A method according to claim 1, wherein said forced synthetic resin is substantially identical to said outer synthetic resin.

6. A method according to claim 1, wherein:
    said main channel is generally annular; and
    the step of intermittently flowing said inner synthetic resin includes intermittently flowing said inner synthetic resin through an inner channel disposed substantially in a center of said main channel.

7. A method according to claim 1 wherein:
    a cycle time for forming said composite synthetic resin is T; the step of intermittently flowing said inner synthetic resin takes place between about 0.05 T and about 0.70 T; and
    the step of intermittently flowing said forced synthetic resin takes place between about 0.10 T and about 0.80 T.

8. A method according to claim 7 wherein:
    the step of intermittently flowing said inner synthetic resin takes place between about 0.10T and about 0.70 T; and
    the step of intermittently flowing said forced synthetic resin takes place between about 0.10 T and 0.70 T.

9. A method according to claim 1, further comprising:
    flowing an intermediate synthetic resin into said outer synthetic resin;
    the flowing of an intermediate synthetic resin being started before the beginning of the step of intermittently flowing said inner synthetic resin; and the flowing of an intermediate synthetic resin continuing at least until the end of said step of intermittently flowing said inner synthetic resin, whereby said inner synthetic resin is substantially encapsulated in said intermediate synthetic resin.

10. A method according to claim 9 wherein:
a cycle time for forming said composite synthetic resin is T;
the step of flowing said intermediate synthetic resin under pressure taking place at from about 0.10 T to 0.05 T before the start of said intermittently flowing of said inner synthetic resin under pressure; and
the step of flowing said intermediate synthetic resin is stopped at least 0.10 T after the step of intermittently flowing of said inner synthetic resin.

11. A method according to claim 9, wherein said intermediate synthetic resin is adhesive to said outer synthetic resin and said inner synthetic resin.

* * * * *